United States Patent
Gagneux et al.

(10) Patent No.: US 12,117,147 B2
(45) Date of Patent: Oct. 15, 2024

(54) UNIVERSAL ADAPTOR BRACKET FOR PORTABLE HEADLAMP

(71) Applicant: Zedel, Crolles (FR)

(72) Inventors: Tiphaine Gagneux, Grenoble (FR); Raphael Bortolotti, Annecy le Vieux (FR); Gregory Martin, Les Adrets (FR); Frederic Reymond, Les Adrets (FR)

(73) Assignee: Zedel, Crolles (FR)

( * ) Notice: Subject to any disclaimer, the term of this patent is extended or adjusted under 35 U.S.C. 154(b) by 159 days.

(21) Appl. No.: 17/848,680

(22) Filed: Jun. 24, 2022

(65) Prior Publication Data

US 2022/0412543 A1  Dec. 29, 2022

(30) Foreign Application Priority Data

Jun. 25, 2021  (FR) ..................... 2106875

(51) Int. Cl.
*F21V 21/088*  (2006.01)

(52) U.S. Cl.
CPC .............. *F21V 21/0885* (2013.01)

(58) Field of Classification Search
CPC .................................. F21V 21/0085
See application file for complete search history.

(56) References Cited

U.S. PATENT DOCUMENTS

| | | | |
|---|---|---|---|
| 6,283,620 B1 | 9/2001 | Taylor et al. | |
| 8,517,559 B1* | 8/2013 | Freschl | F21L 13/06 362/183 |
| 9,829,182 B1 | 11/2017 | McCaslin et al. | |
| 2003/0021105 A1* | 1/2003 | Cramer | F21V 21/30 362/396 |
| 2004/0252494 A1 | 12/2004 | Parsons et al. | |
| 2007/0159809 A1 | 7/2007 | Kim et al. | |
| 2009/0077721 A1* | 3/2009 | Prendergast | F41H 1/08 2/209.13 |
| 2018/0202207 A1 | 7/2018 | Eichelberger | |

FOREIGN PATENT DOCUMENTS

| | | |
|---|---|---|
| EP | 0 560 328 A1 | 9/1993 |
| WO | 2016/023063 A1 | 2/2016 |
| WO | 2016/033670 A2 | 3/2016 |

OTHER PUBLICATIONS

French Search Report, National application No. FR2106875, Applicant: Zedel, Search Completion Date: Feb. 25, 2022, 6 pages.

* cited by examiner

*Primary Examiner* — Leah Simone Macchiarolo
(74) *Attorney, Agent, or Firm* — Salle Ackerman LLC; Stephen B. Ackerman

(57) ABSTRACT

A adaptor bracket for a wide range of removable portable lamps intended to be fixed on various supports or accessories. The bracket has a base or frame having a first supporting lug with a circular groove to engage a first rib and has a second supporting lug with a circular groove to allow engagement of a second rib. The adaptor bracket has a locking system based on a stopper or locking clip intended to block the engagement of the first and second ribs at a predetermined position.

15 Claims, 30 Drawing Sheets

UNIVERSAL ADAPTOR BRACKET FOR PORTABLE HEADLAMP

TECHNICAL FIELD

The present invention relates to the field of portable lamps and more specifically to a universal adaptor bracket for removable portable lamp

BACKGROUND

The use of portable lamps tends to become widespread in all human activities, whether professional, sports or leisure activities.

Historically, construction or miners' helmets, such as those illustrated in FIGS. 1A and 1B, were equipped with portable lamps. FIG. 1B particularly shows a miner's helmet equipped with a bracket 1 for attaching a headlamp.

Today, as seen in FIGS. 1C and 1D respectively, sports and safety helmets are equipped with a headlamp mounting bracket.

SUMMARY

There is a wish to develop the possibilities of fixing a portable lamp on various supports or accessories and, consequently, to be able to count on a universal adaptor bracket allowing the fixing of a wide range of removable portable lamps.

This is the subject of this patent application.

It is an object of the present invention to provide a universal adaptor bracket allowing a secure fixing system for a removable portable lamp, without risk of accidental fall.

It is another object of the present invention to allow a universal adaptor bracket which allows a compact fixing system with a removable portable lamp of variable dimensions.

It is a third purpose of this invention to provide an architecture of adaptor brackets that can be designed in several versions: safety helmet, bicycle, or any support whatsoever.

The present invention makes it possible to achieve all these objects by producing an adaptor bracket for a removable portable lamp comprising a base or a frame comprising a first supporting lug and a second supporting lug.

The first supporting lug has, on its upper face, a first groove of substantially circular profile, configured to allow engagement of a first substantially circular rib of a removable portable lamp having a first dimension. Similarly, the second supporting lug has, on its underside, a second substantially circular profile groove, configured to allow engagement of a second substantially circular profile rib of said removable portable lamp. Furthermore, the adaptor bracket comprises a locking system based on a stop or a locking clip intended to block the engagement of said first and second ribs at a predetermined position in the first and second grooves.

In a particular embodiment, the base comprises a tongue or locking clip comprising a stud which is positioned in the middle of the first groove corresponding to the first supporting lug. The tongue has sufficient flexibility to allow elastic deformation so that when the first rib of the lamp—having a notch in its middle—is engaged in the corresponding groove of the first supporting lug, a stress is applied to the supporting lug or locking clip so as to flex the latter in order to allow said first rib to slide until the notch is positioned under the stud of the supporting lug or locking clip so as to block the positioning of the lamp.

Preferably, the adaptor bracket comprises a third supporting lug located above the second supporting lug and the third supporting lug comprises, on its lower face, a third groove of substantially circular profile configured to allow engagement of a second rib of substantially circular profile d a portable lamp having a second larger dimension.

Preferably, the grooves corresponding to said first, second and third circular supporting lugs have a radius of curvature within a range equal to 100-200 mm, and preferably equal to 150 mm.

In a particular embodiment, the adaptor bracket is a bicycle adaptor bracket.

In another embodiment, the adaptor bracket is a adaptor bracket for a safety helmet having a rear tongue configured to be inserted into a corresponding slot in the front of a safety helmet to allow attachment of a light portable removable on the construction helmet. The tongue is made of an elastic material allowing, when inserting the tongue into the slot of the helmet, to exert a pressure pushing the adaptor bracket towards the safety helmet. Optionally, the rear tongue has a circular recess intended to receive a self-adhesive circular pad or patch allowing secure attachment of the adaptor bracket to the hard hat.

In another embodiment, the adaptor bracket comprises at the rear four fixing lugs each provided with a self-adhesive adhesive so as to allow the fixing of the adaptor bracket on a substantially flat support.

BRIEF DESCRIPTION OF THE DRAWINGS

Other features of one or more embodiments of the invention will appear from the following description of embodiments of the invention, with reference being made to the accompanying drawings.

DESCRIPTION

We now describe a general structure of a universal adaptor bracket allowing a compact fixing for a wide range of removable portable lamps or more generally any useful accessory.

This general structure can be broken down into different embodiments, as illustrated in FIGS. 2A-2D.

Figure 1A:
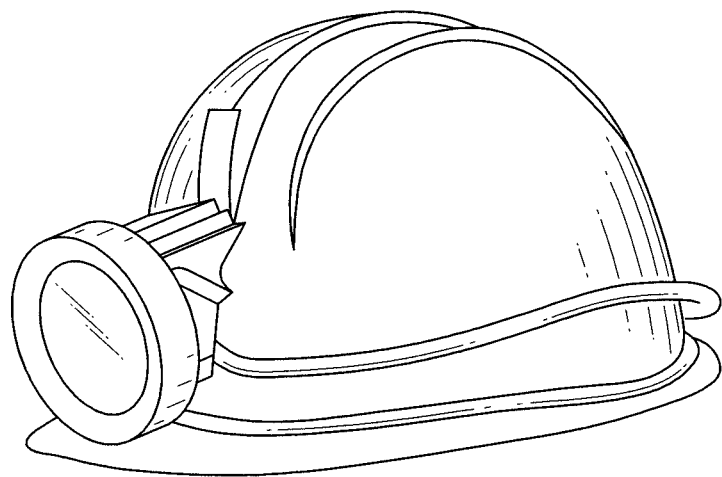
FIGS. 1A, 1B, 1C and 1D illustrate known fastening systems for safety helmets.
Figure 1B:
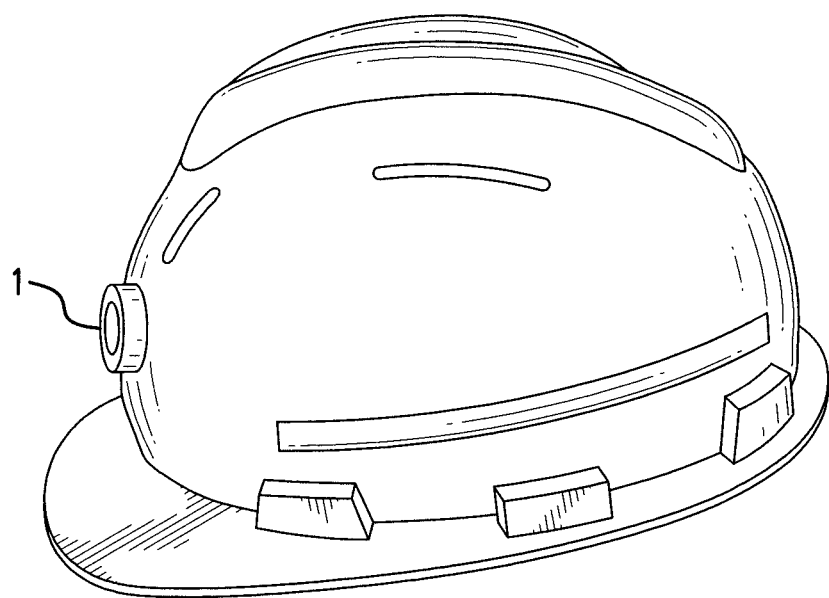
Figure 1C:
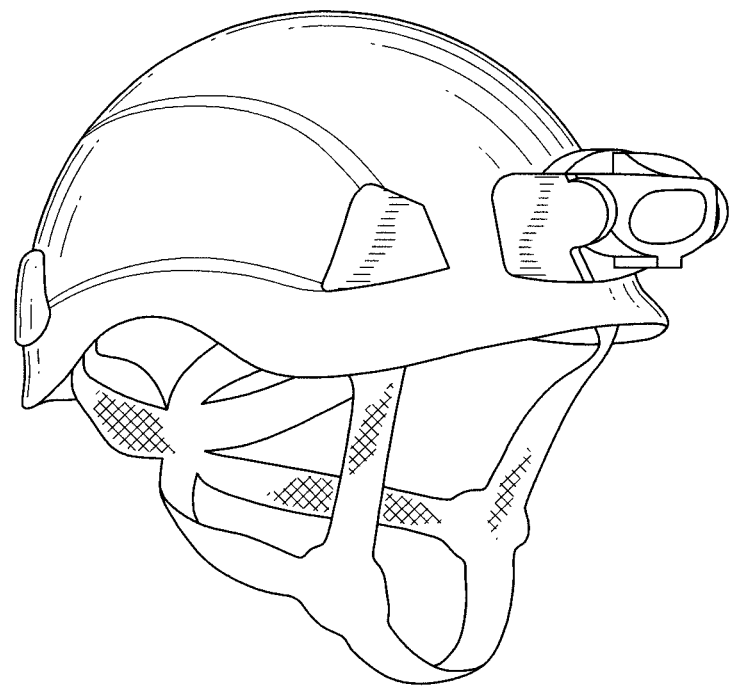
Figure 1D:
Figure 2A:
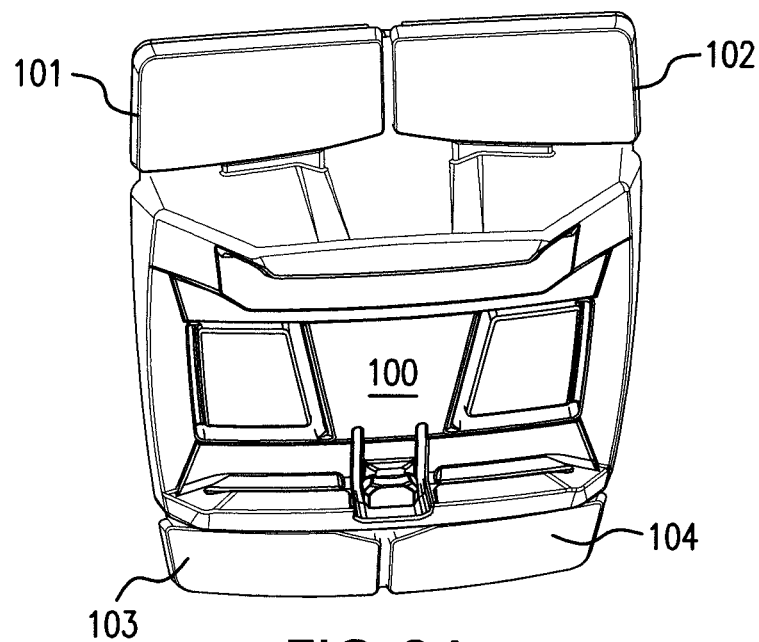
FIGS. 2A, 2B, 2C and 2D show four embodiments of an adaptor bracket according to the present invention.

Indeed, FIG. 2A illustrates an embodiment of an adaptor bracket 100 in accordance with the present invention comprising four fixing lugs 101, 102, 103, 104 each provided with a self-adhesive adhesive so as to allow fixing of the adaptor bracket on a substantially flat or curved support.

Figure 2B:
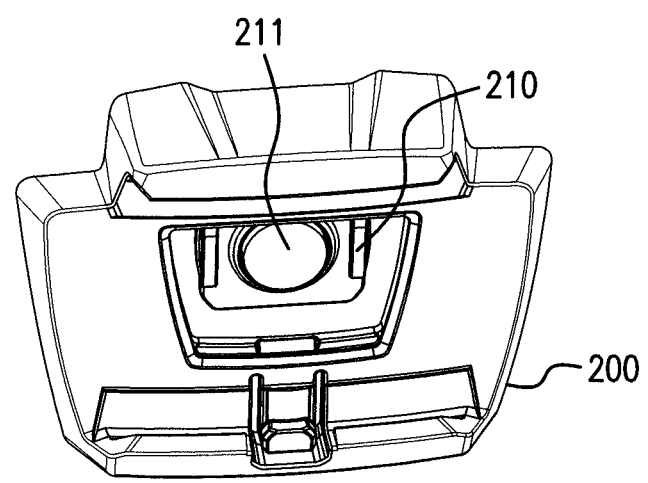

FIG. 2B more specifically illustrates a second embodiment of an adaptor bracket 200 configured for a safety helmet or hard hat, comprising a rear tongue 211 configured to be inserted inside a predetermined slot located at the front of a safety helmet. The Tongue 211 is made of an elastic material allowing, when inserting the tongue into the slot of the safety helmet, to exert a pressure pushing the adaptor bracket towards the safety helmet. Specifically, the tongue 211 comprises a circular recess intended to receive a circular self-adhesive pellet or patch allowing more secure attachment if the user so wishes.

Figure 2C:
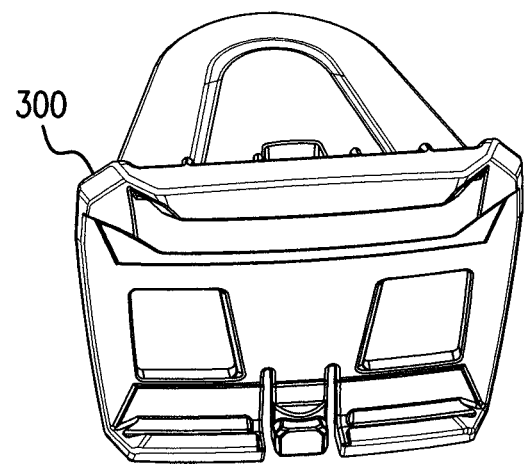

FIG. 2C illustrates a third embodiment of an adaptor bracket 300 for a bicycle or motorcycle which can be fixed in particular to a handlebar.

Figure 2D:
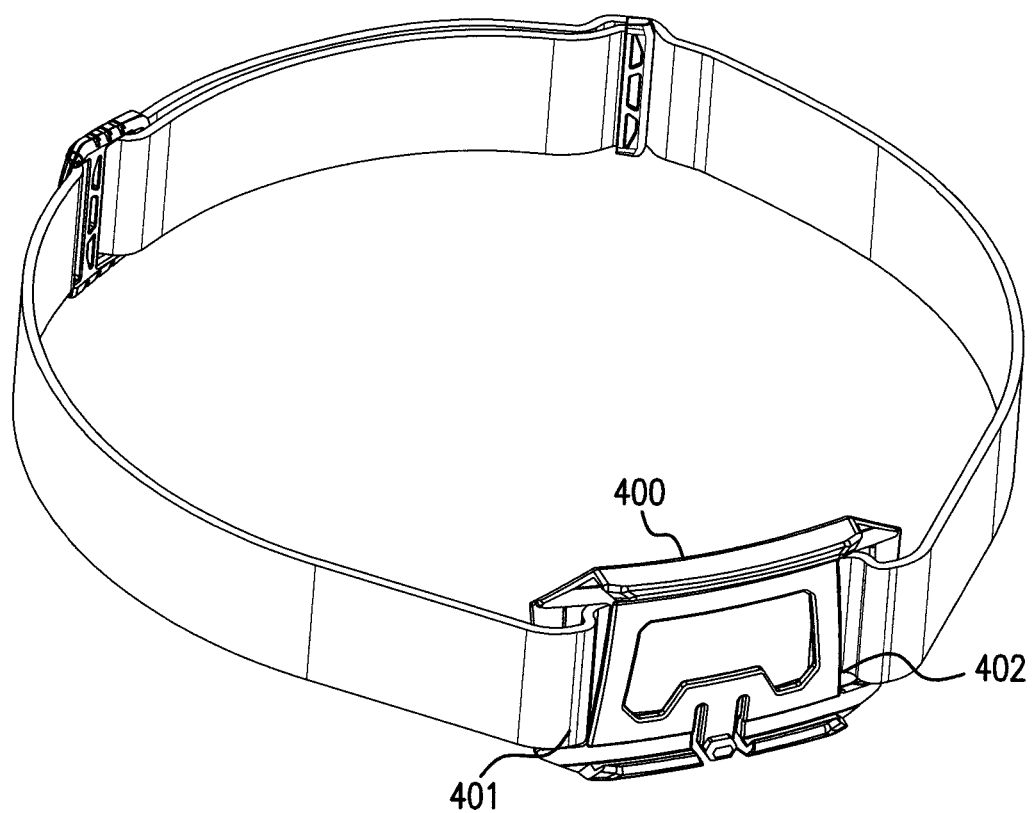

Finally, FIG. 2D illustrates a fourth embodiment of an adaptor bracket 400 specifically provided with two fixing lugs 401 and 402 for a headband in order to carry out a headlamp.

The adaptor bracket of FIG. 2A will now be described in more detail, it being understood that the description will of course apply to all the other adaptor brackets of FIGS. 2B-2D and others as well.

Figure 3A:
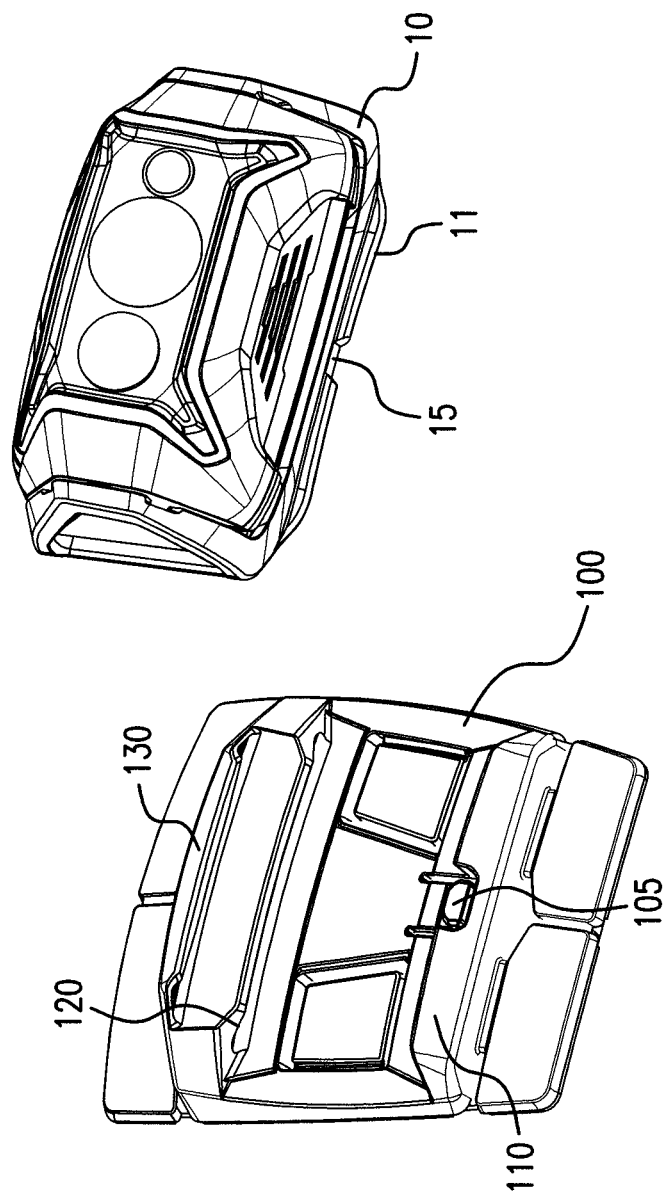
FIGS. 3A, 3B, 3C, 3D, 3E, 3F, 3G, 3H, 3I, 3J, 3K and 3M illustrate the installation of a first large-sized removable lamp, on the adaptor bracket of FIG. 2D.
Figure 3B:
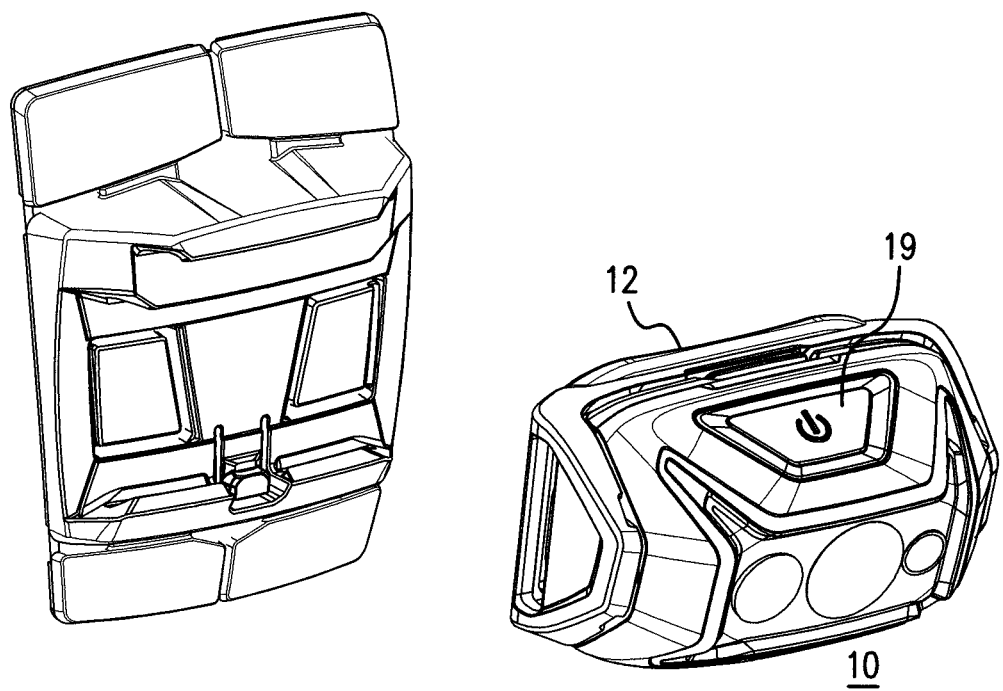
Figure 3C:
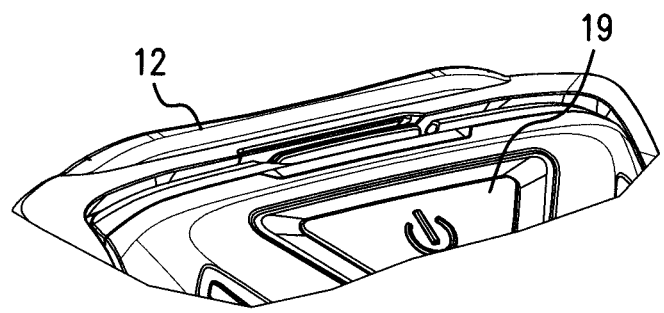
Figure 3D:
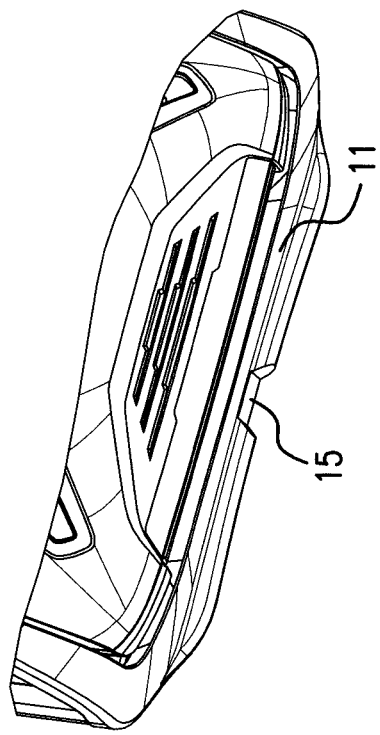
Figure 3D:
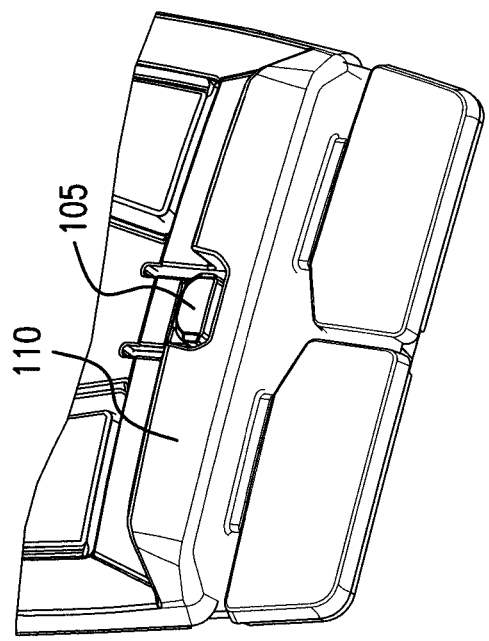

FIGS. 3A, 3B and 3D more precisely illustrate the detail of adaptor bracket 100 as illustrated in FIG. 2A comprising, as mentioned earlier a frame or base associated with the four fixing lugs 101, 102, 103, 104. In order to allow the attachment of a portable lamp or any other useful movable accessory, accessory bracket 100 is additionally fitted with a new specific circular rail projection arrangement that includes circular grooves configured to mate with two corresponding circular ribs of a corresponding movable accessory.

Thanks to such system, the user may very easily mate or slide the two parts together and facilitate removable attachment of the accessory to the adaptor bracket and thus the safety helmet. The sliding of the two parts is based on a circular moving thanks to the circular profiles of both the grooves on the rail projection arrangement and the ribs, thus complying with the particular geometry of a safety helmet.

For that purpose, adaptor bracket comprises 100 comprises a first lower horizontal supporting lug 110, a second upper horizontal supporting lug 120 and, optionally, a third upper horizontal supporting lug 130 located above the second supporting lug.

All supporting lugs 110, 120 and optionally 130 are integral with the adaptor bracket 100 and carry out a projection arrangement with respect to the adaptor bracket, realizing at least one and preferably two rail systems for the circular moving and attachment of an portable lamp or accessory. More particularly, each supporting lug 110, 120 and optionally 130 has a respective circular groove which is configured to cooperate and mate the circular profiles of ribs 11 and 12 of a removable portable lamp or accessory part to be removably attached to the helmet.

Thus, the connection between the removable portable lamp to be guided and attached to the adaptor bracket and the guide adaptor bracket is ensured by the engagement of two dedicated circular ribs 11 and 12 in FIG. 3A and 3B, integral with the headlamp in the corresponding circular grooves formed by supporting lugs 110, 120 (resp. 130) integral with the adaptor bracket 100.

As seen in FIG. 3A, the supporting lug 110 has a circular groove located on its upper part while the supporting lug 120 (resp. 130) has a circular groove located on its lower part.

In one embodiment, the circular profile of the supporting lugs 110, 120 and optionally 130 corresponds to a circular profile having a radius of curvature comprised in a range equal to 100-200 mm. Preferably the radius of curvature is fixed at 150 mm.

As can be seen in FIGS. 3A and 3B showing respectively two bottom and top perspective views, a large removable lamp 10 comprises a first lower rib 11 of circular profile configured to engage in the curved groove also of the supporting lug 110. In a similar manner, the removable lamp 10 comprises a second upper rib 12 of circular profile intended to engage in the circular groove of supporting lug 130 which is furthest from the supporting lug 110.

By sliding the lamp 10 into the two circular grooves of the supporting lugs 110 and 130, it is thus possible to create a solid and secure connection between the lamp 10 and the adaptor bracket 100.

In a particular embodiment, there is also a stop or locking mechanism, preferably located on the lower supporting lug 110.

Preferably, there is a tongue or locking clip 105 integral with the base or the frame of bracket 100 and having sufficient flexibility to allow elastic deformation. The tongue or locking clip 105 has at its end a protrusion or stud which is positioned in the middle of the groove corresponding to the first supporting lug 110. The rib 11 of the lamp 10 has in its middle a notch configured to cooperate with the locking clip 105 so that when the rib 11 is engaged in the curved groove of the supporting lug 110, a stress is applied to the flexible material of the tongue 105 which flexes to allow the sliding of the rib 11 in the tongue until the notch 15 is positioned at the level of the nipple of the tongue or flexible clip allowing the latter to return to its rest position, thus achieving secure blocking and locking of the lamp 10.

Of course, the locking system could be arranged on one side of the rib in another embodiment. Any other stop and abutment system may be considered.

It will be noted in this illustrative example that the lamp 10, of large size, has two different lower rib 11 and upper rib 12 since only the rib 11 has a notch 15. This asymmetry within the lamp 10, associated with the configuration of the adaptor bracket 100 makes it possible to achieve keying ensuring that the user will always position the lamp 10 in the right direction, that is to say with a control button 19 located at the top of the lamp 10.

Figure 3E:
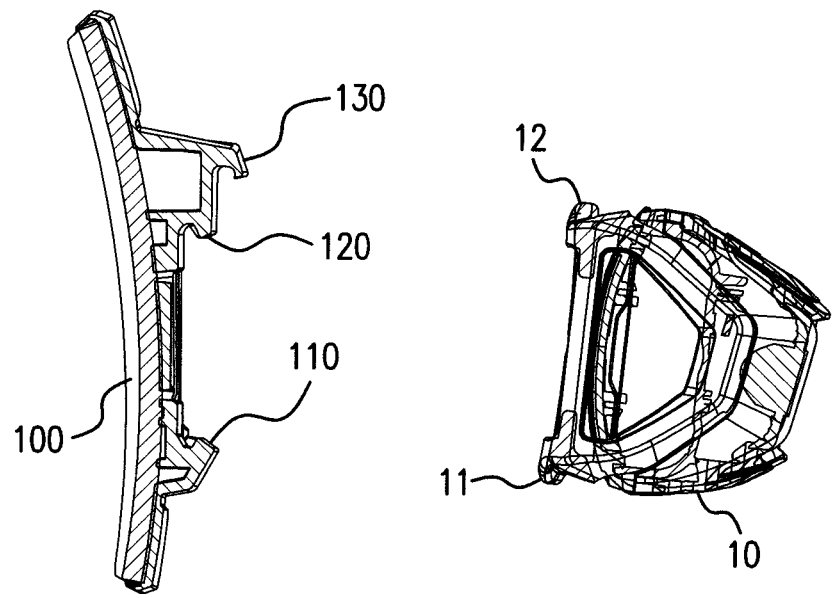
Figure 3F:
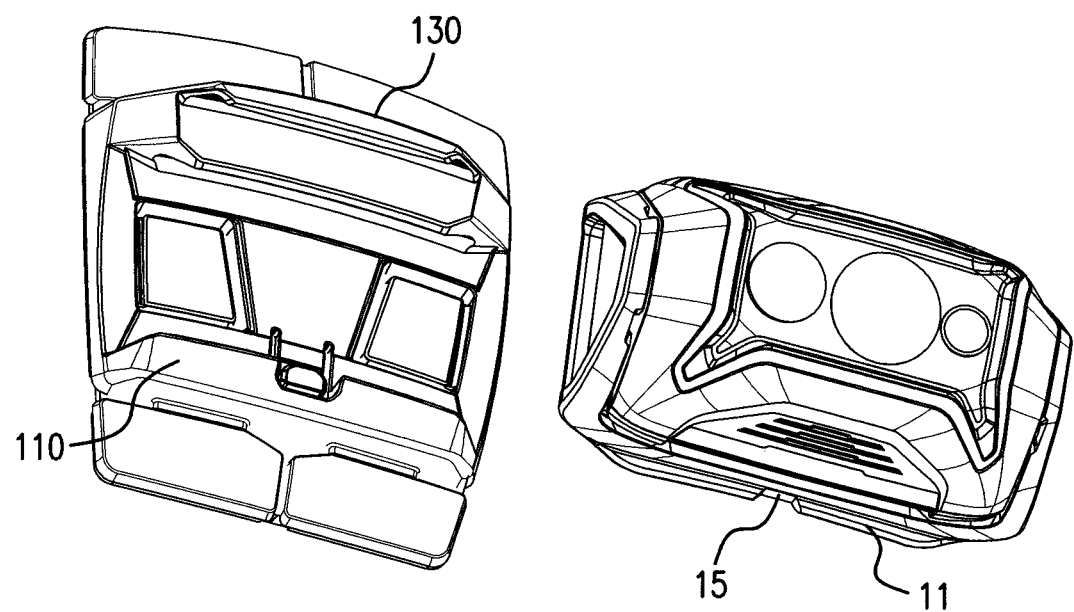
Figure 3G:
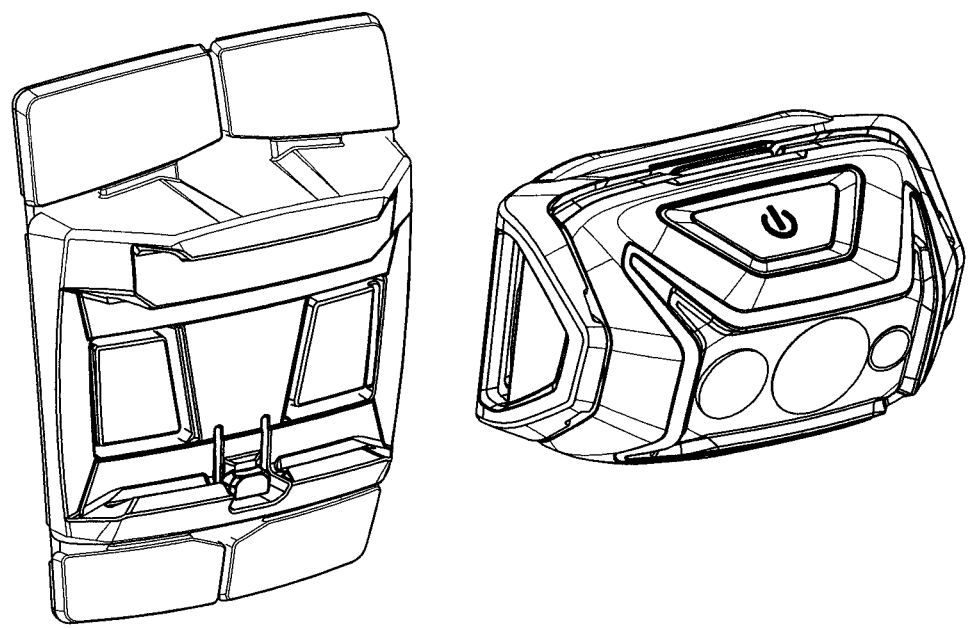
Figure 3H:
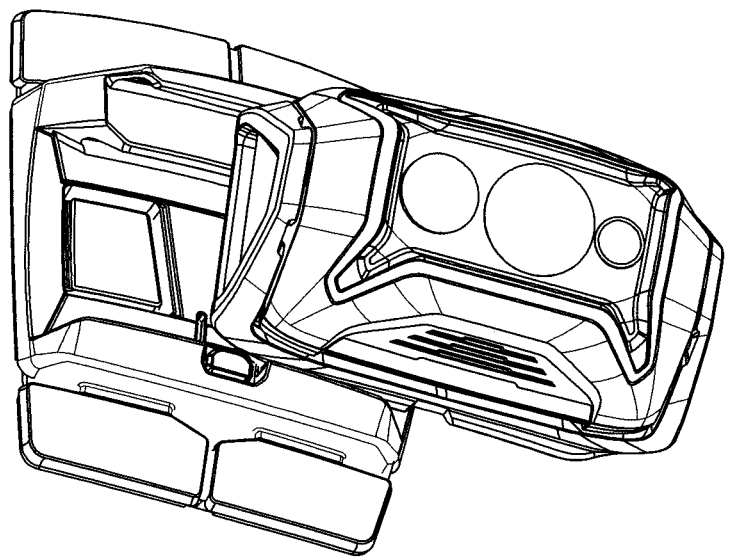
Figure 3I:
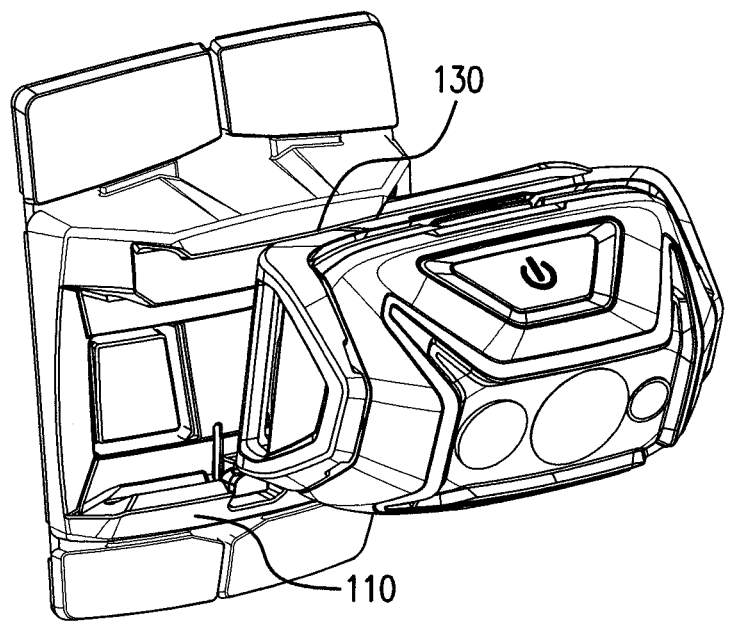
Figure 3J:
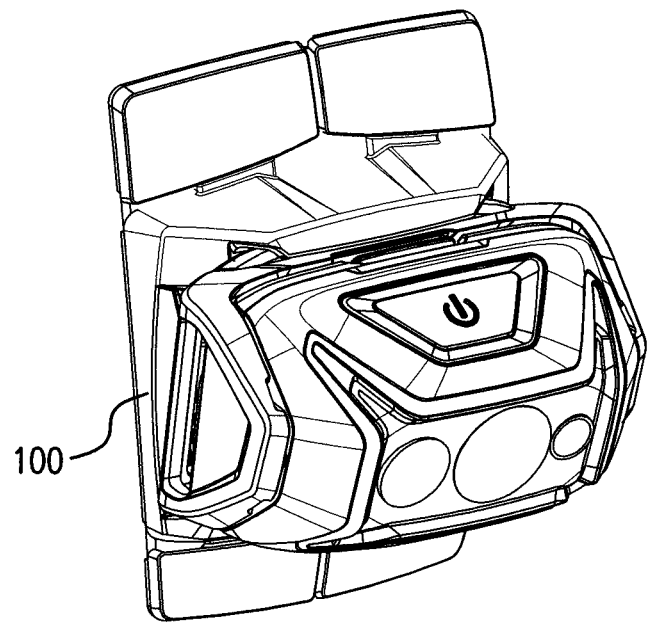
Figure 3K:
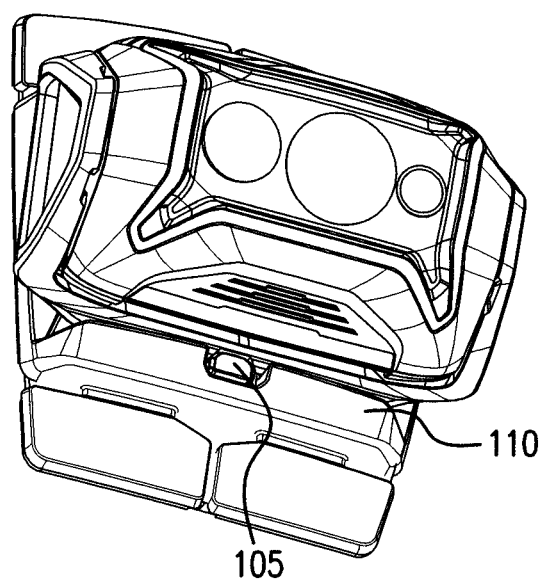

FIG. 3E illustrates a cross section of the adaptor bracket 100 and the lamp 10, while FIGS. 3F, 3G, 3H, 3I, 3J and 3K illustrate a bringing together of the removable lamp 10 and the engagement of its ribs 11 and 12 in the grooves associated with the supporting lugs 110 and 130, until the complete engagement of the curved ribs 11 and 12 in their respective grooves and the locking of the lamp 100 by means of the locking clip 105.

Figure 3L:
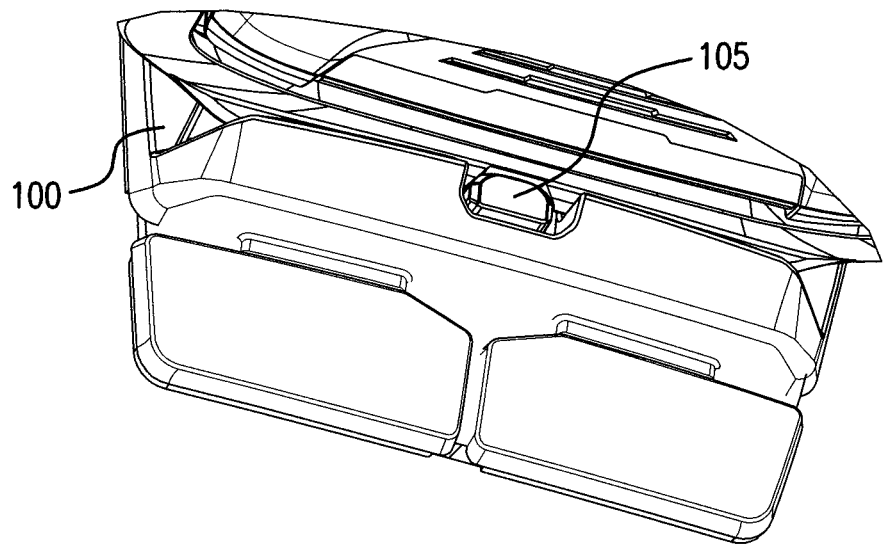
FIG. 3L illustrates a detail view of the locking clip 105 when the rib 11 of the lamp 10 is in place.

FIG. 3L illustrates a detail view of the locking clip 105 when the rib 11 of the lamp 10 is in place.

Figure 3M:
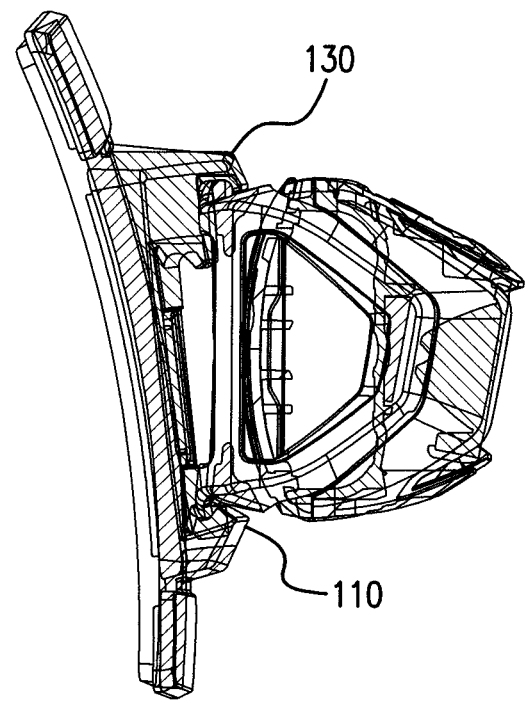

Finally, FIG. 3M is a cross section of the lamp 10 fixed on the adaptor bracket 100, and firmly held by the two supporting lugs 110 and 130.

Figure 4A:
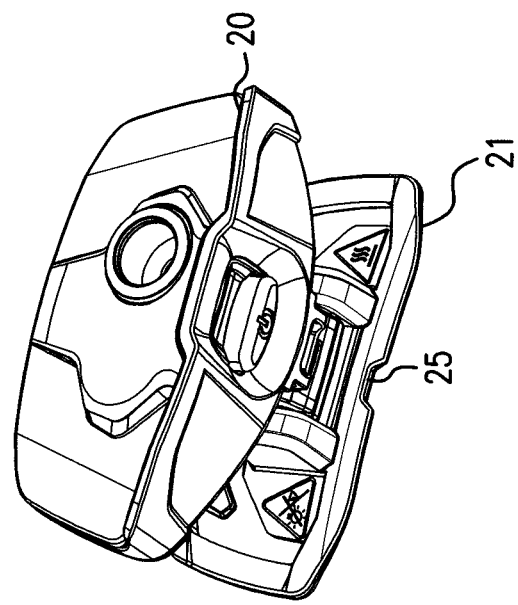
FIGS. 4A, 4B, 4C, 4D, 4E, 4F, 4G, 4H, 4I, 4J and 4K illustrate the installation of a second removable lamp, of reduced size, on the adaptor bracket of FIG. 2D.
Figure 4A:
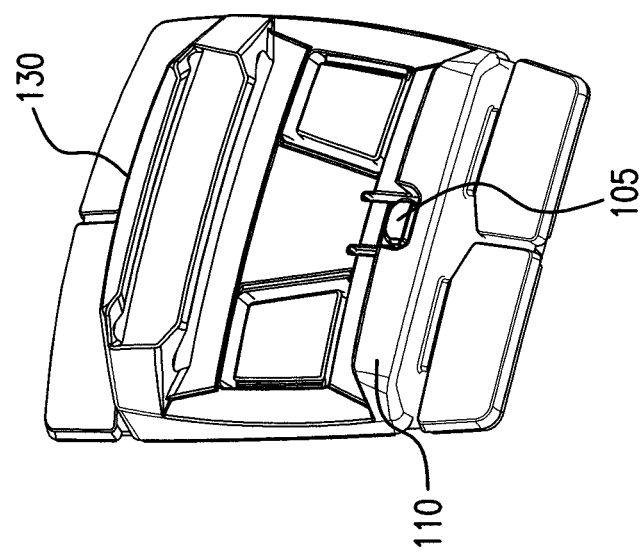
Figure 4B:
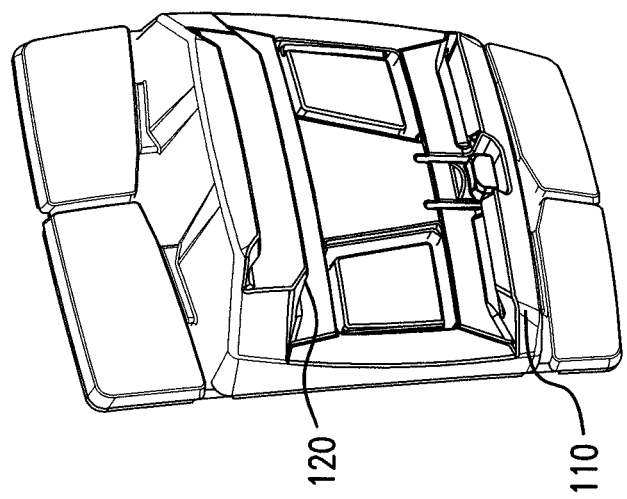
Figure 4B:
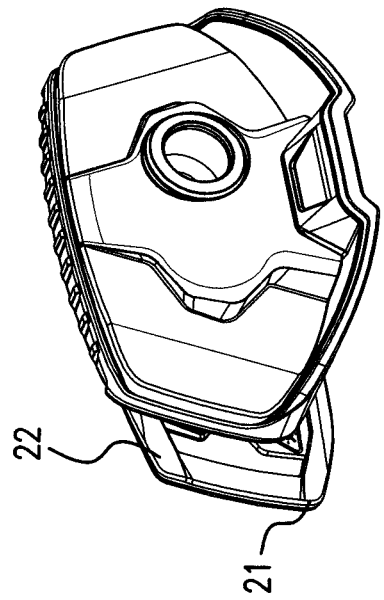

FIGS. 4A-4K are used to describe the use of the same adaptor bracket 100 to ensure solid and secure attachment of a removable lamp 20 of smaller size, comprising a lower rib 21 of circular profile and an upper rib 22 of circular profile shown in FIG. 4B, and configured to engage in the corresponding grooves of the supporting lugs 110 and 120 of the adaptor bracket 100.

Figure 4C:
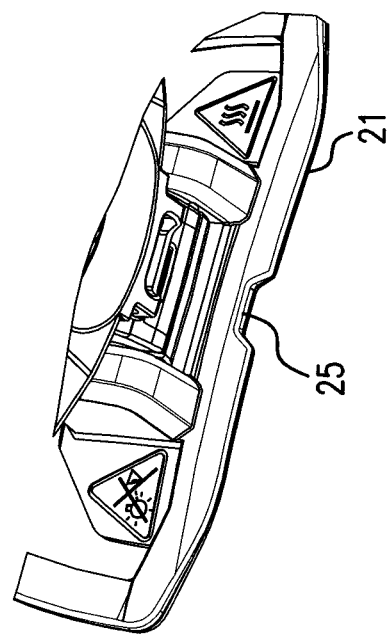
Figure 4C:
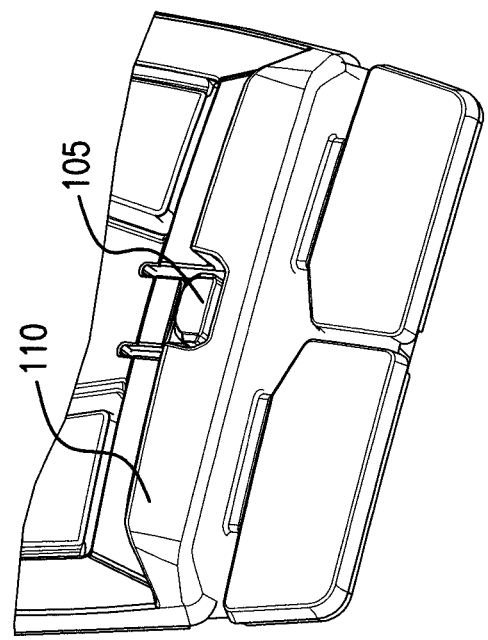
Figure 4D:
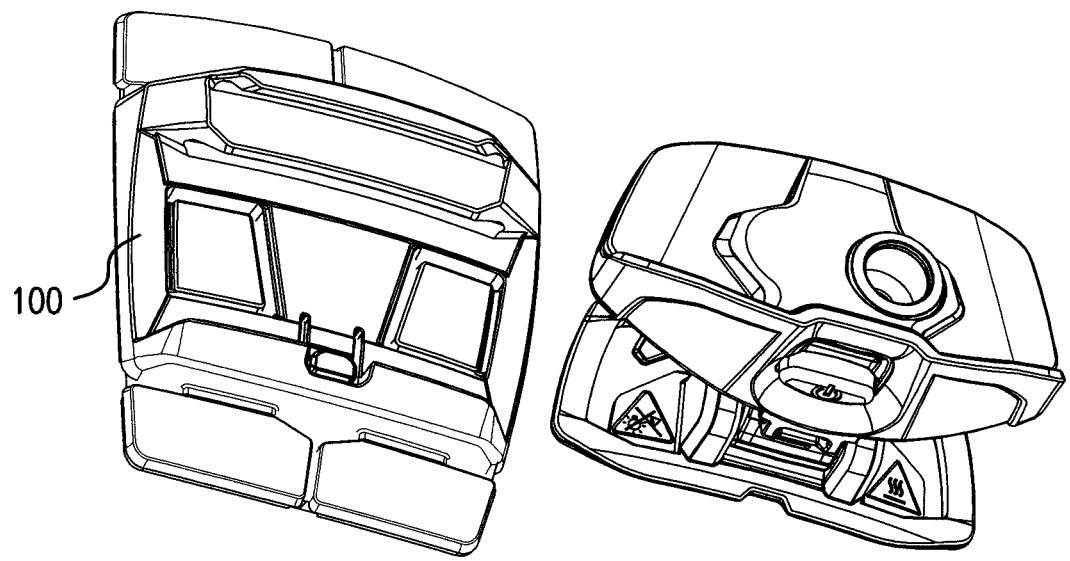
Figure 4E:
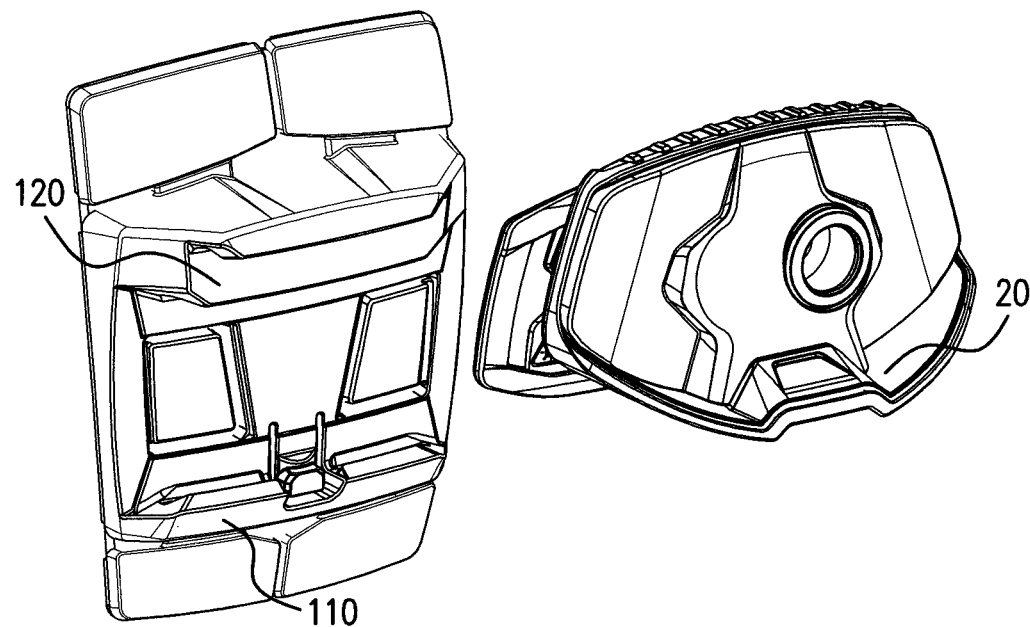
Figure 4F:
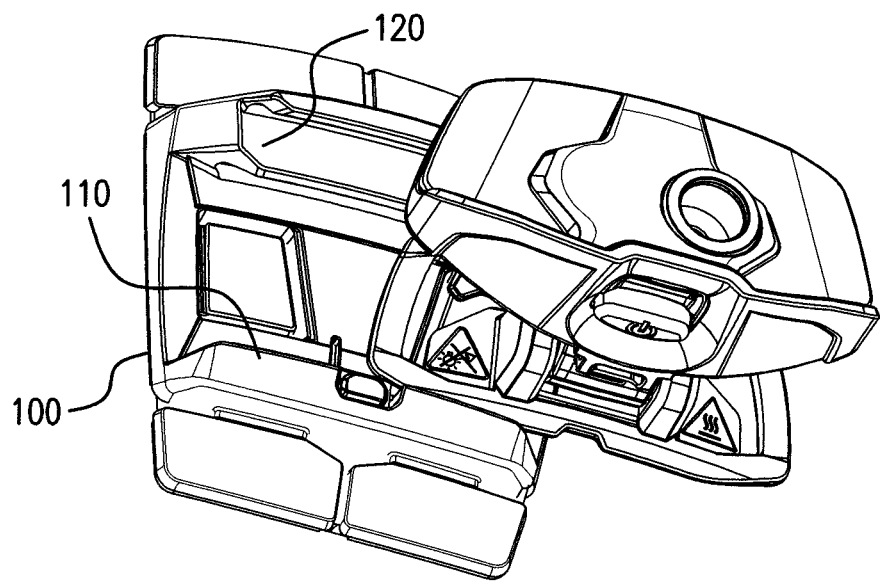
Figure 4G:
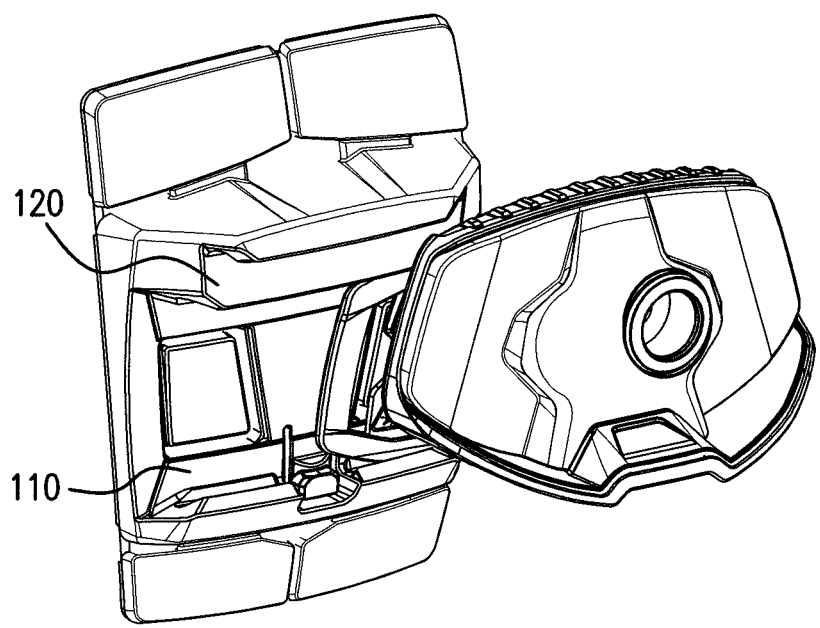
Figure 4H:
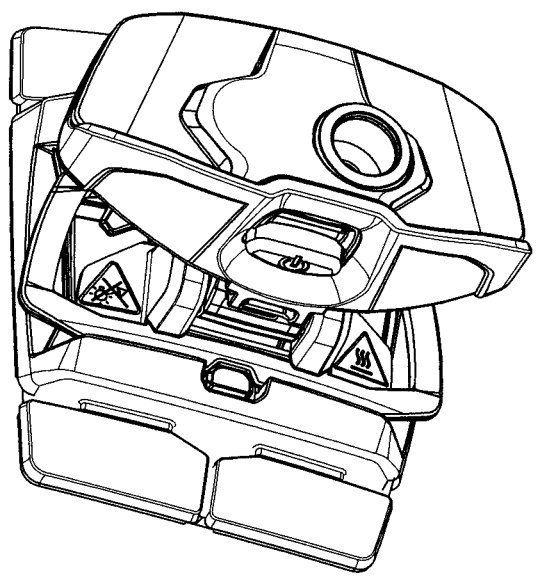
Figure 4I:
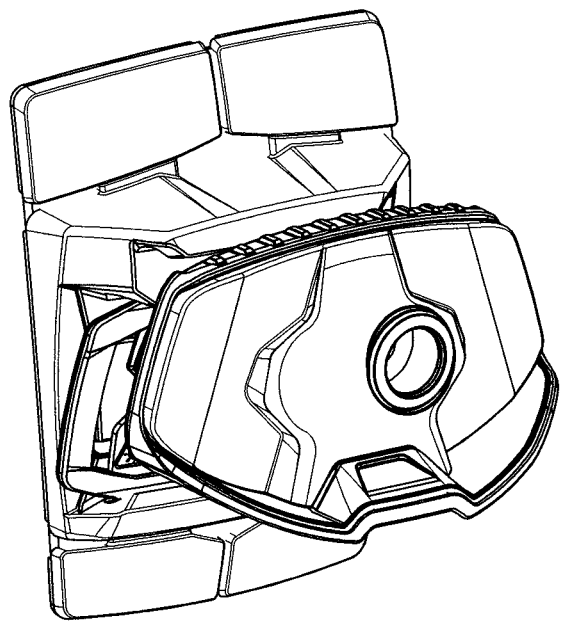

Lamp 20 corresponds to a small "sports" type lamp which, in a preferred embodiment, also includes a notch 25 similar to notch 15 of lamp 10, as shown in FIG. 4C, upper rib 22 does not have a notch, like rib 12 of lamp 10.

FIGS. 4D, 4E, 4F, 4G 3G, 4H and 4I illustrate a rapprochement of the removable lamp 20 and the engagement of its ribs 21 and 22 in the grooves associated with supporting lugs 110 and 120, until the complete engagement of the ribs and to the locking of the lamp 20 with the locking clip 105.

Figure 4J:
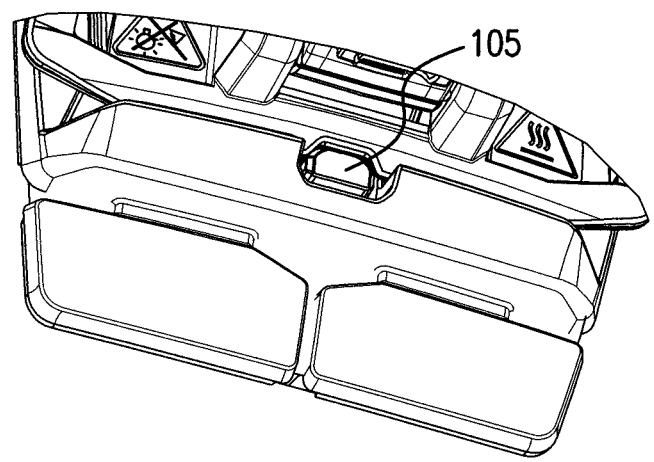
Figure 4K:
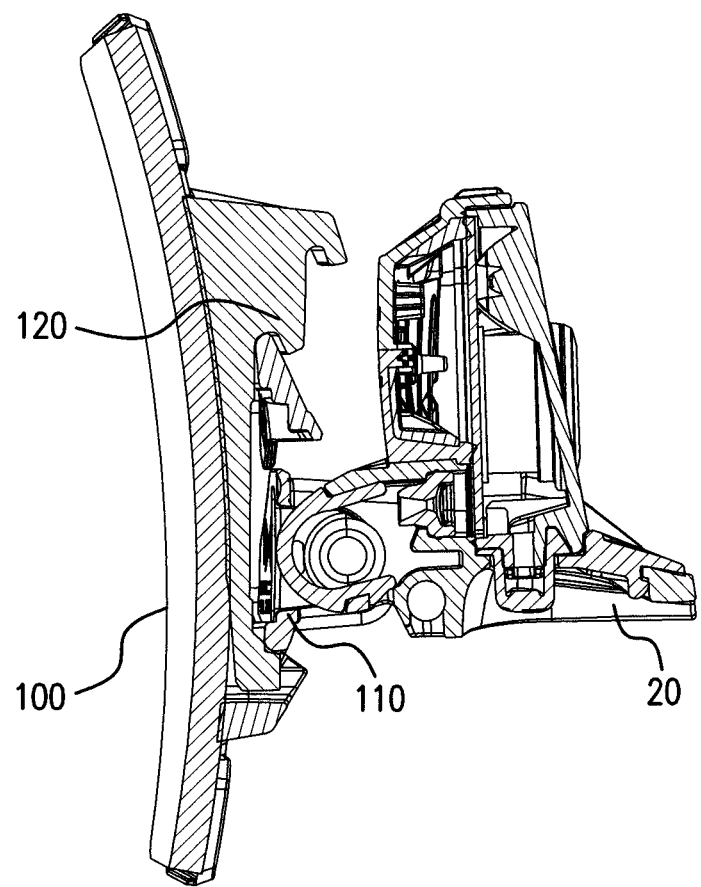

FIG. 4J illustrates a detail view of the locking clip 105 when the rib 21 of the lamp 20 is in place and, finally, FIG. 4K is a cross section of the lamp 20 fixed on the adaptor bracket 100, and securely held by the two supporting lugs 110 and 120.

Will now be described in relation to FIGS. 5A-5D a removable portable lamp 30 of large size, comprising two curved ribs, each comprising in its middle a notch 35 (resp. 36) configured to cooperate with the locking clip 105 of the 'adaptor bracket.

As before, the ribs 31 and 32 are configured to engage in the corresponding grooves of the supporting lugs 110 and 130 and therefore have a circular profile with a radius of curvature between 100 mm and 200 mm.

Figure 5A:
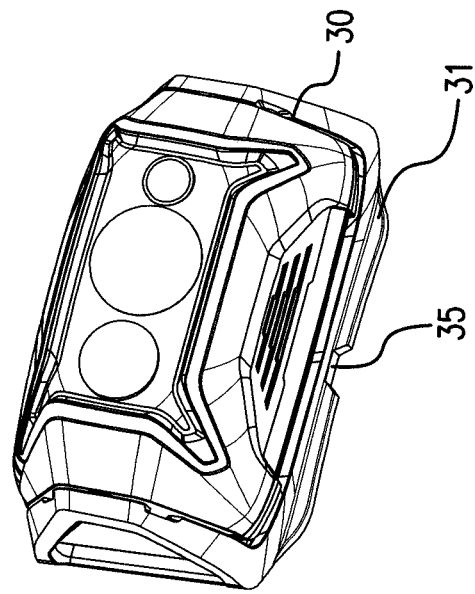
FIGS. 5A, 5B, 5C and 5D illustrate a third removable reversible lamp, allowing, at the choice of the user, two different positionings of the lamp on the adaptor bracket.
Figure 5A:
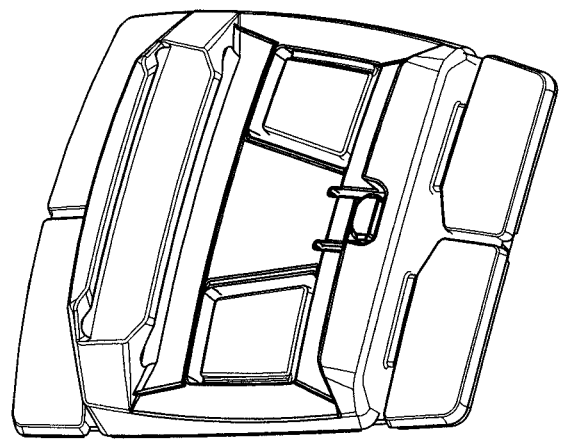
Figure 5B:
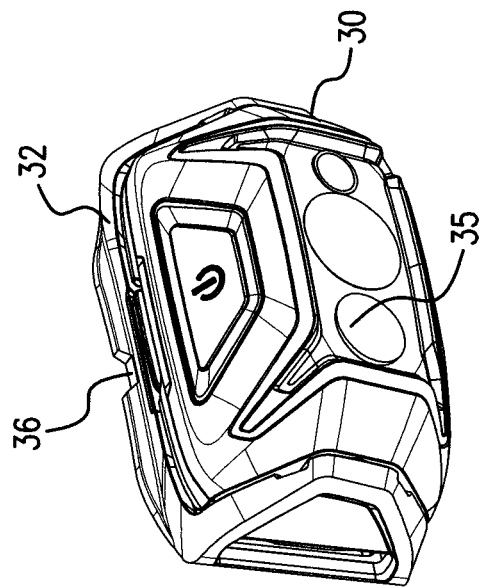
Figure 5B:
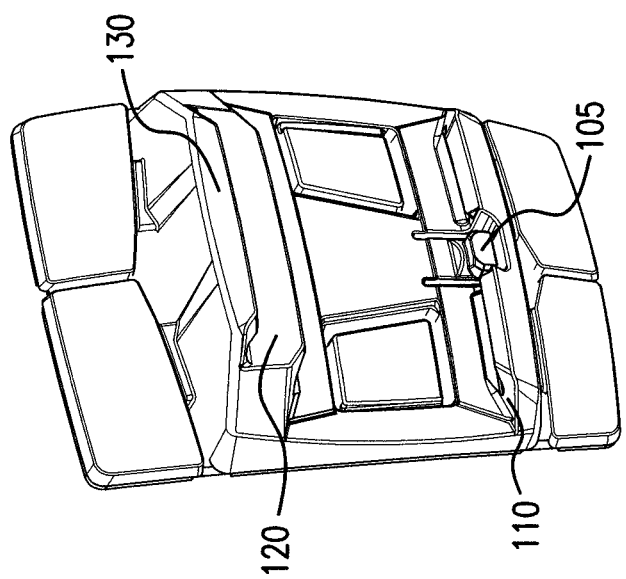
Figure 5C:
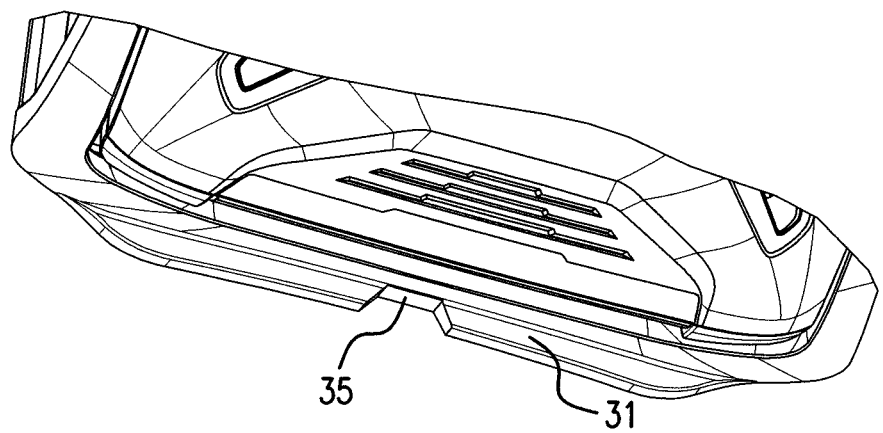
Figure 5D:
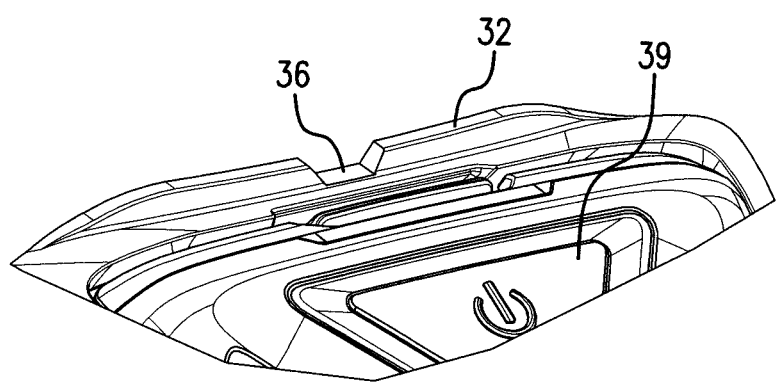

FIG. 5C illustrates a detail of the lower rib 31 and its notch 35 while FIG. 5D illustrates a detail of the upper rib 32 with its notch 36.

Thanks to this double notch 35-36, the lamp 30 can be fixed on the adaptor bracket 100—or any other adaptor bracket illustrated in particular in the FIGS. 2B-2D, in two different ways, with the control button 39 located at the top or at the bottom, at the user's choice.

FIGS. 6A, 6B, 6C, 6D, 6E, 6F, 6G, 6H, illustrate a bringing together of the removable lamp 30 and the engagement of its ribs 31 and 32 in the grooves associated with the furthest supporting lugs 110 and 130, until 'to the complete engagement of the ribs and to the locking of the lamp 30 with the locking clip 105 cooperating with the groove 35.

In this arrangement, the removable lamp 30 is positioned according to a first configuration with the control button 39 located at the top . . .

FIGS. 6A, 6B, 6C, 6D, 6E, 6F, and 6G illustrate bringing the removable lamp 30 closer together and the engagement of its ribs 31 and 32 in the grooves associated with the furthest supporting lugs 110 and 130, up to the complete engagement of the ribs and the locking of the lamp 30 with the locking clip 105 cooperating with the groove 35.

Figure 6A:
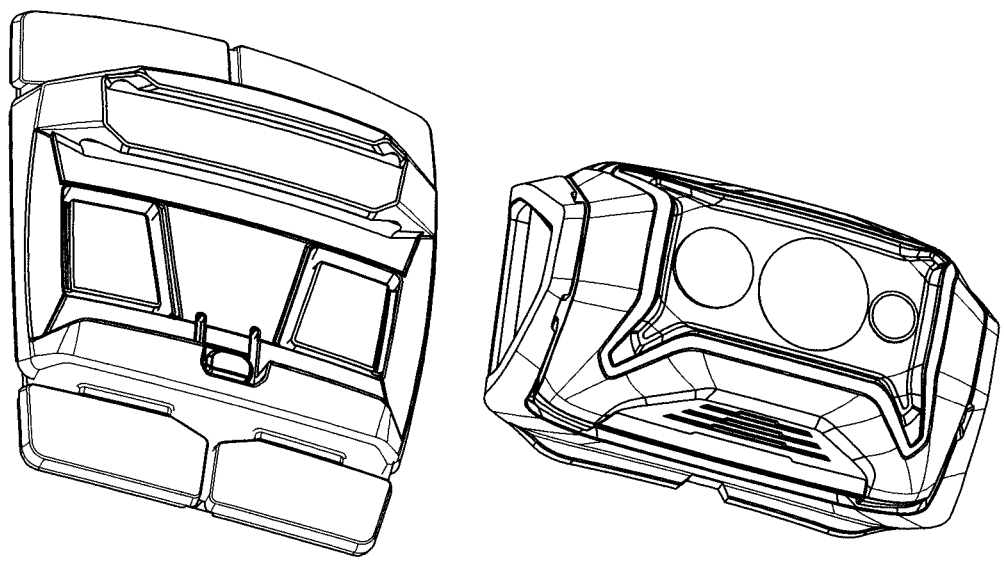
FIGS. 6A, 6B, 6C, 6D, 6E, 6F, 6G and 6H illustrate the installation of the third removable lamp on the adaptor bracket of FIG. 2D, in which the control button is positioned at the top.
Figure 6B:
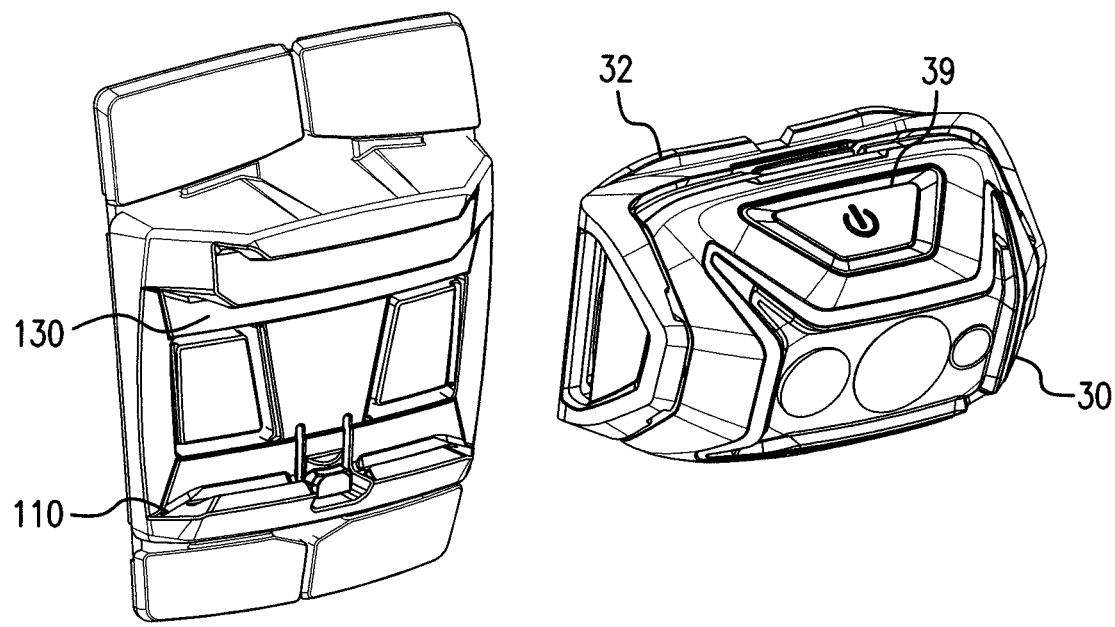
Figure 6C:
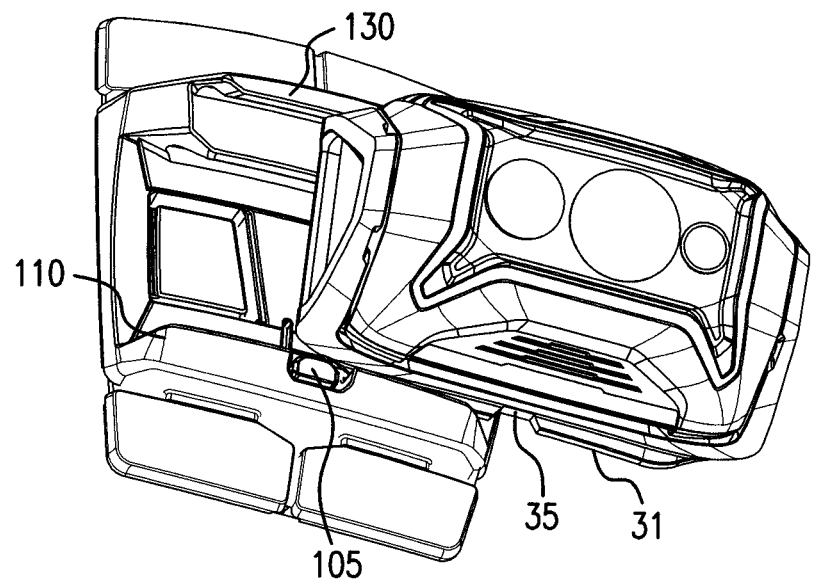
Figure 6D:
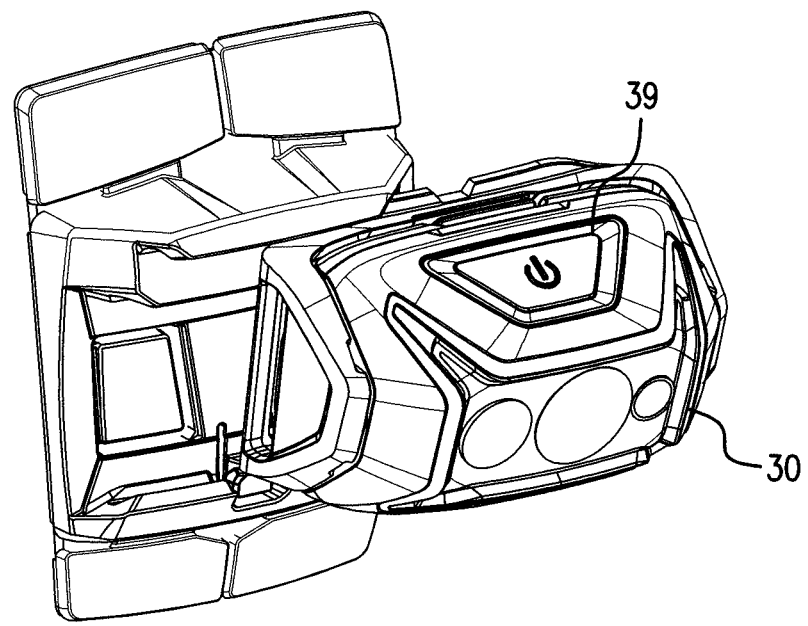
Figure 6E:
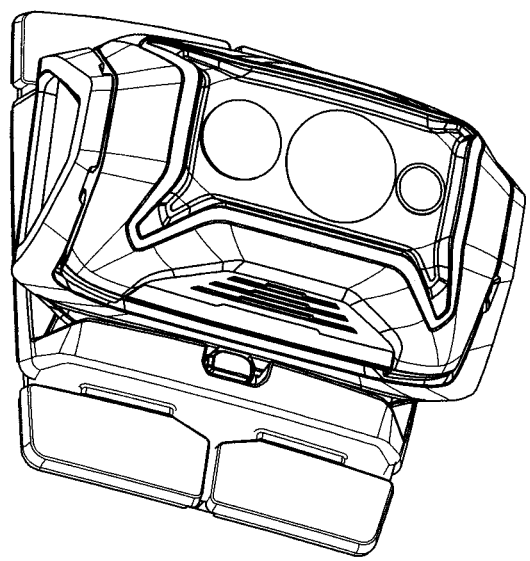
Figure 6F:
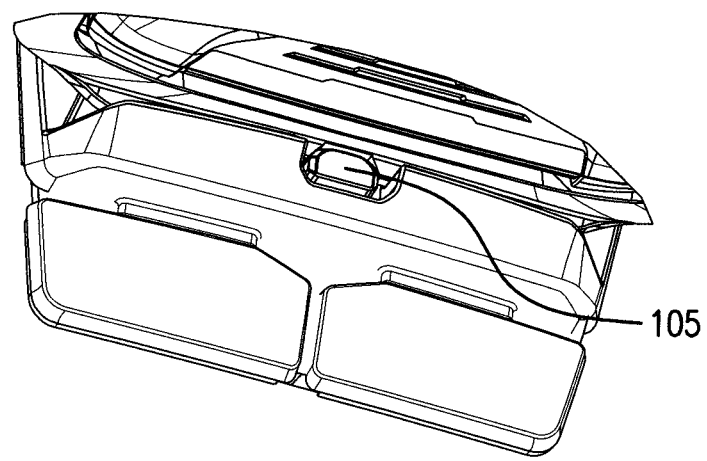
Figure 6G:
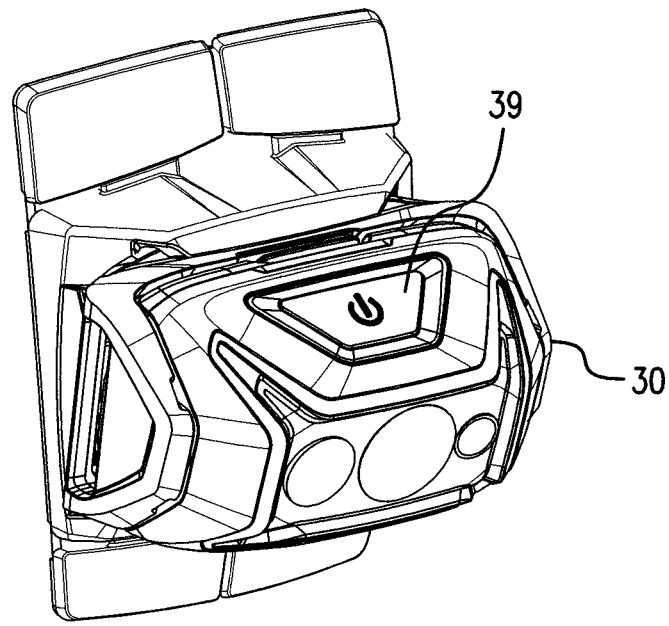
Figure 6H:
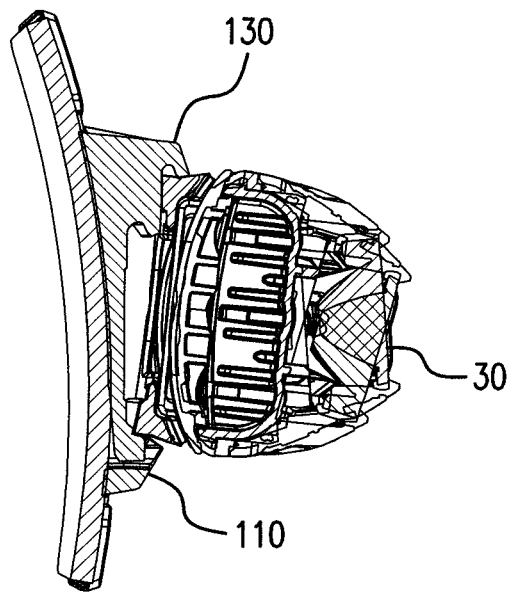

FIG. 6H is a section illustrating the positioning of the lamp 30 held between the two supporting lugs 110 and 130.

In this arrangement, the removable lamp 30 is positioned according to a first configuration with the control button 39 located at the top . . .

FIGS. 7A, 7B, 7C, 7D, 7E, 7F, and 7G illustrate bringing together the removable lamp 30 and the engagement of its ribs 31 and 32 in the grooves associated with the furthest supporting lugs 110 and 130, up to the complete engagement of the ribs and the locking of the lamp 30 with the locking clip 105 cooperating with the groove 36.

Figure 7A:
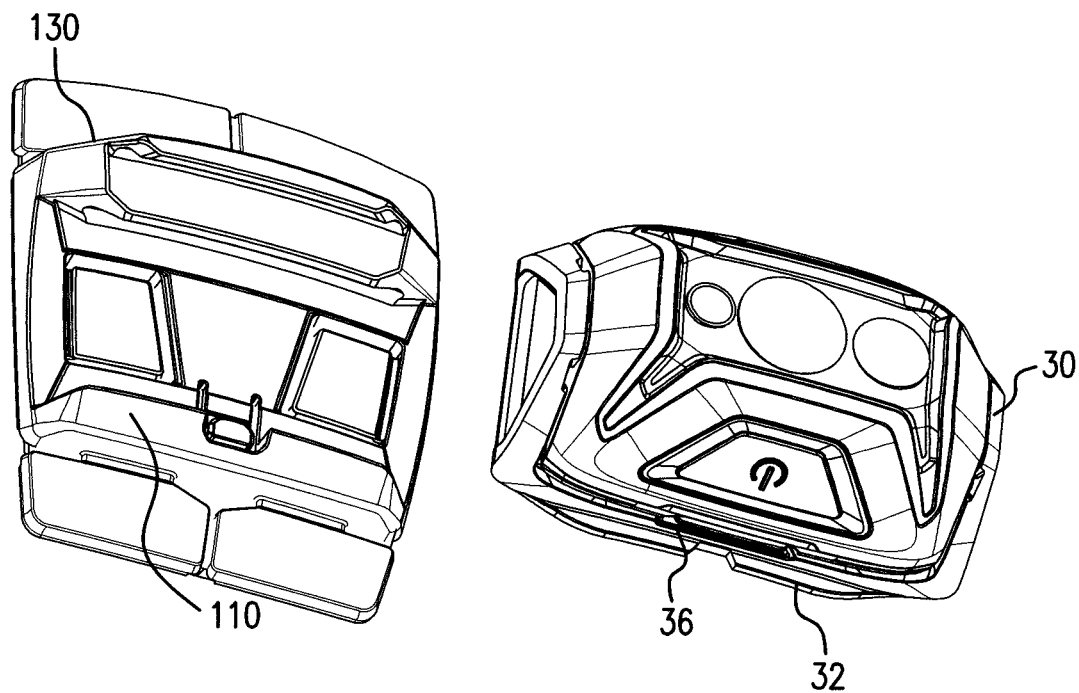
FIGS. 7A, 7B, 7C, 7D, 7E, 7F, 7G and 7H illustrate the installation of the third removable lamp on the adaptor bracket of FIG. 2D, in which the control button is positioned at the bottom.
Figure 7B:
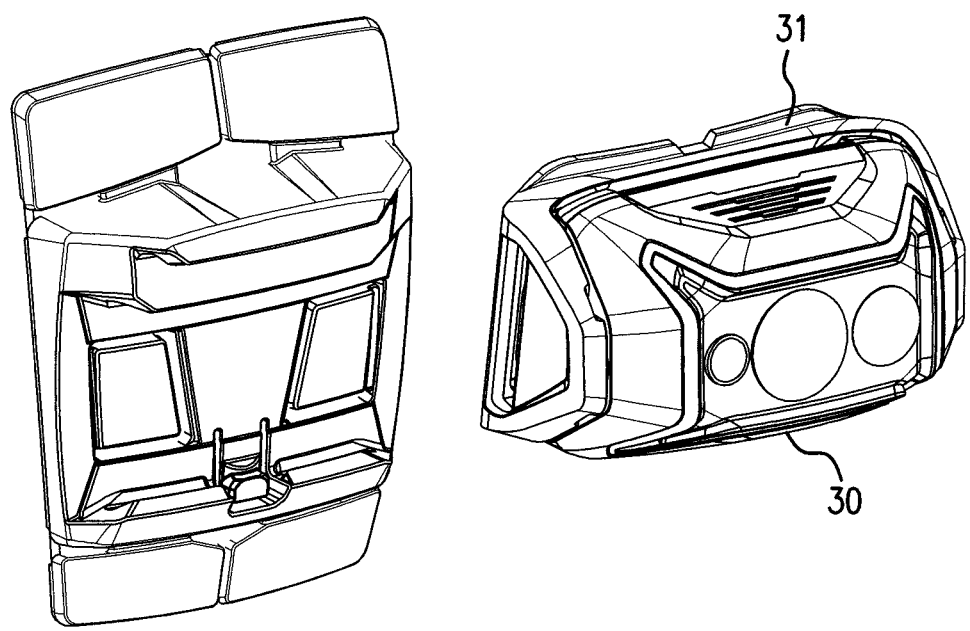
Figure 7C:
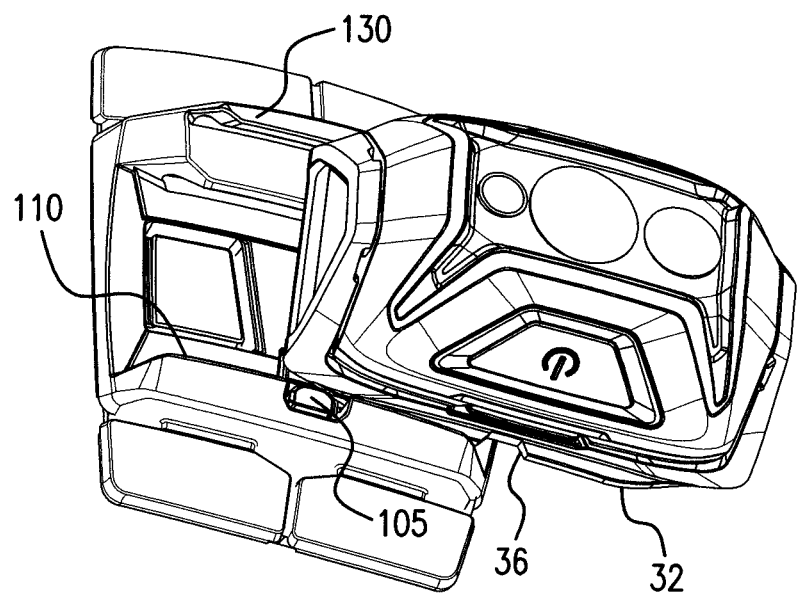
Figure 7D:
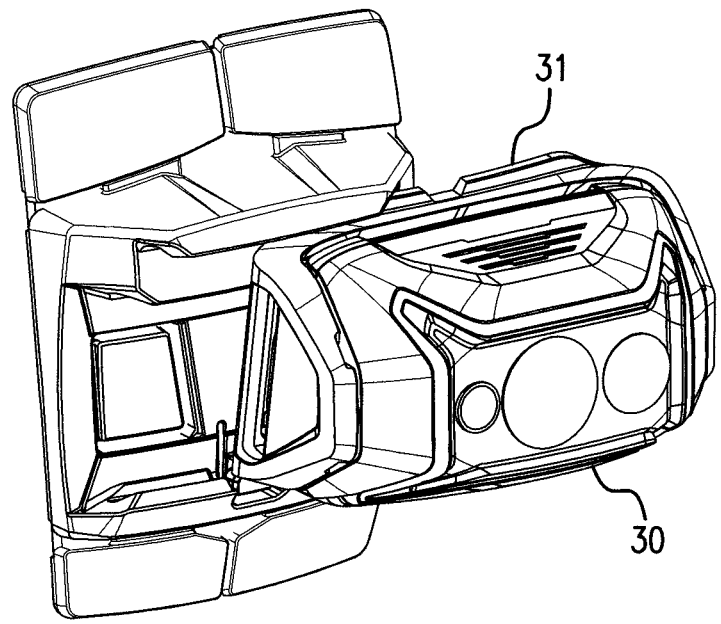
Figure 7E:
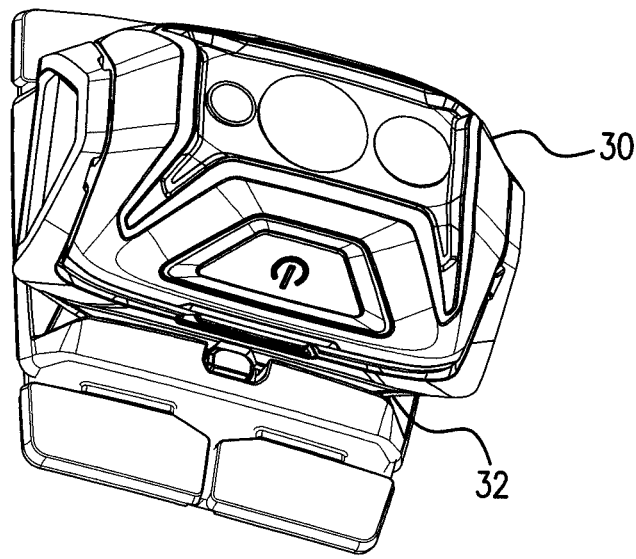
Figure 7F:
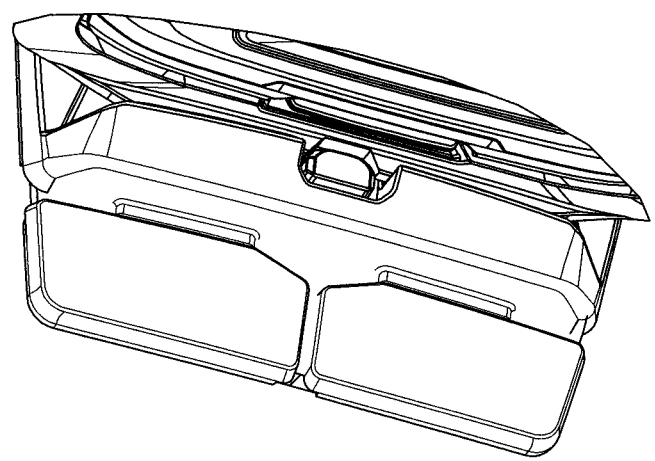
Figure 7G:
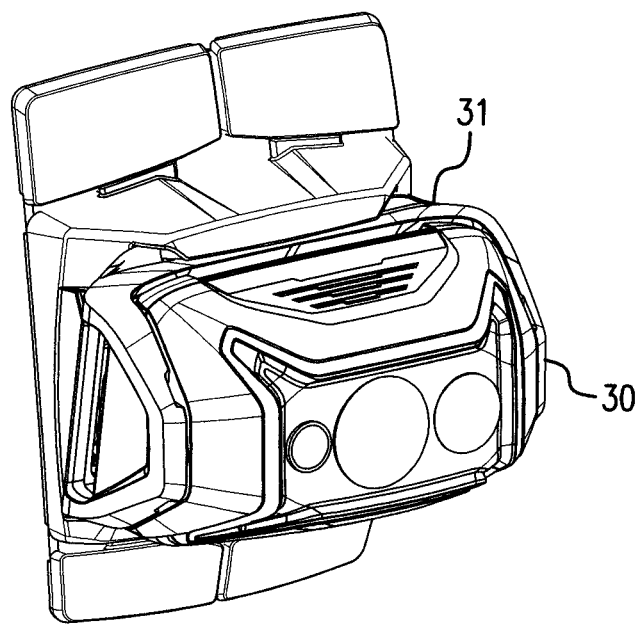
Figure 7H:
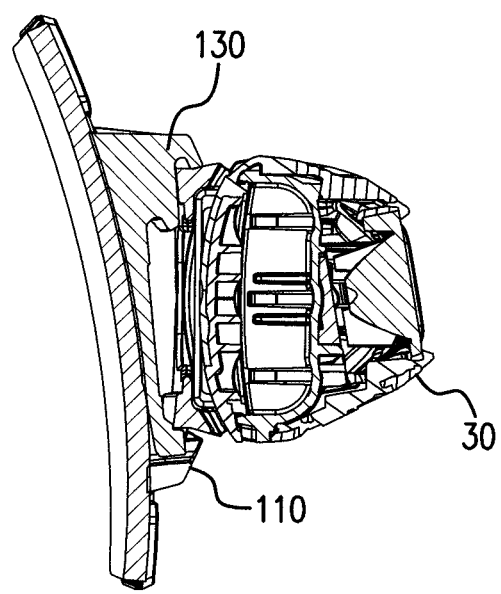

FIG. 7H is a section illustrating the positioning of the lamp 30 held between the two supporting lugs 110 and 130.

In this arrangement, the removable lamp 30 is positioned in a second configuration with the control button 39 located at the bottom.

This second configuration can be very advantageous in certain circumstances, for example when the removable lamp is mounted on a safety helmet on which there are other accessories that may interfere with the use of a control button located on the top.

Alternatively, the user could also prefer to control the removable lamp with his thumb, which will also lead him to favor this second configuration and, consequently, the cooperation of the notch 36 with the locking clip 105.

As can be seen, the proposed universal adaptor bracket has vast configuration possibilities, with the fixing of lamps of various sizes and also has great compactness due to the curvature of the fixing lugs allowing a removable lamp to be held at most near a construction helmet.

What is claimed is:

1. An adaptor bracket for a removable portable lamp intended to be fixed on a support and comprising:
    a base or frame having a first supporting lug and a second supporting lug;
    wherein the first supporting lug has, on its upper face, a first groove of substantially circular profile, wherein said circular profile is configured to correspond to the circular shape of a helmet, wherein said first supporting leg is configured to allow engagement of a first substantially circular rib of a removable portable lamp having a first dimension;
    wherein the second supporting lug has, on its underside, a second groove of substantially circular profile, configured to allow engagement of a second rib of substantially circular profile of said removable portable lamp;
    wherein the adaptor bracket comprises a locking system based on a stopper or a locking clip intended to block the engagement of said first and second ribs at a predetermined position
    wherein the grooves corresponding to said first and said second supporting lugs have a radius of curvature within a range equal to 100-200 mm, and preferably equal to 150 mm.

2. The adaptor bracket for a removable portable lamp as defined in claim 1 wherein said base or said frame comprises locking clip comprising a stud which is positioned in the middle of the first groove corresponding to said first supporting lug, said tongue having sufficient flexibility to allow elastic deformation, so that when the first rib of said removable portable lamp is engaged in the corresponding groove of said first supporting lug,
    wherein the first rib has a notch in its middle configured to cooperate with said locking clip, a stress is printed on said locking clip so as to flex the latter in order to allow the sliding of said first rib until said notch is positioned under said tab or locking clip so as to block the positioning of said removable portable lamp.

3. The adaptor bracket according to claim 2, further comprising a third supporting lug located above the second supporting lug; wherein the third supporting lug has, on its underside, a third groove of substantially circular profile configured to allow engagement of a second rib of substantially circular profile of a portable lamp having a second dimension, wherein the second dimension is greater than the first dimension.

4. The adaptor bracket according to claim 1, wherein the grooves corresponding to said first, second and third circular supporting lugs have a radius of curvature within a range equal to 100-200 mm, and preferably equal to 150 mm.

5. The adaptor bracket according to claim 1 wherein the adaptor bracket is a bicycle adaptor bracket.

6. The adaptor bracket according to claim 1 wherein the adaptor bracket is an adaptor bracket for a safety helmet comprising a rear tongue configured to be inserted into a corresponding slot located at the front of a safety helmet so as to allow the fixing of a removable portable lamp on said safety helmet; wherein the tongue is made of an elastic material allowing, when inserting the tongue into the slot of the helmet, to print a bias of the adaptor bracket towards the safety helmet.

7. The adaptor bracket according to claim 6 wherein said rear tongue has a circular recess intended to receive a self-adhesive circular patch or patch allowing secure attachment of the adaptor bracket to the hard hat.

8. The adaptor bracket according to claim 1 wherein the adaptor bracket comprises four fixing lugs each provided with a self-adhesive adhesive so as to allow the fixing of the adaptor bracket on a substantially flat support.

9. A headlamp comprising a first circular rib and a second circular rib configured to slide into the corresponding groove of said first supporting lugs or one of said second or third supporting lug of the adaptor bracket of claim 1.

10. An adaptor bracket for a removable portable lamp intended to be fixed on a support and comprising;
- a base having a first supporting lug and a second supporting lug;
- wherein the first supporting lug has, on its upper face, a first circular groove configured to allow engagement of a first circular rib of a removable portable lamp or accessory having a first dimension;
- wherein the second supporting lug has, on its underside, a second circular groove configured to allow engagement of a second circular rib of said removable portable lamp or accessory;
- wherein said first circular rib is located at the bottom of the portable lamp or accessory;
- wherein said second circular rib is located at the top of said portable lamp or accessory; and
- wherein both circular grooves and circular ribs are configured to easily mate and slide the parts together in a circular movement, so as to facilitate removable attachment of the portable lamp or accessory to the adaptor bracket, and
- wherein the grooves corresponding to said first and said second supporting lugs have a radius of curvature within a range equal to 100-200 mm, and preferably equal to 150 mm.

11. The adaptor bracket according to claim 10 characterized in that the adaptor bracket comprises a locking system based on a stopper or a locking clip intended to block the engagement of said first and second ribs at a predetermined position,
- in order to allow the attachment of a portable lamp or any other useful movable accessory, accessory bracket is additionally fitted with a new specific circular groove projection arrangement that is configured to mate with two corresponding circular ribs of a corresponding movable accessory.

12. The adaptor bracket as defined in claim 10 wherein said adaptor bracket is configured to be affixed on a safety helmet.

13. The adaptor bracket according to claim 10, further comprising a third supporting lug located above the second supporting lug; wherein the third supporting lug has, on its underside, a third groove of substantially circular profile configured to allow engagement of a second rib of substantially circular profile of a portable lamp having a second dimension, wherein the second dimension is greater than the first dimension.

14. The adaptor bracket according to claim 10, wherein the grooves corresponding to said first, second and third circular supporting lugs have a radius of curvature within a range equal to 100-200 mm, and preferably equal to 150 mm.

15. The adaptor bracket according to claim 10 wherein the adaptor bracket is a bicycle adaptor bracket.

* * * * *